United States Patent
Lee

(10) Patent No.: US 9,742,013 B2
(45) Date of Patent: Aug. 22, 2017

(54) SYSTEM FOR INSPECTING QUALITY OF MEMBRANE-ELECTRODE ASSEMBLY OF FUEL CELL AND QUALITY INSPECTION METHOD THEREOF

(71) Applicant: HYUNDAI MOTOR COMPANY, Seoul (KR)

(72) Inventor: Sun Ho Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 14/884,713

(22) Filed: Oct. 15, 2015

(65) Prior Publication Data
US 2016/0329578 A1 Nov. 10, 2016

(30) Foreign Application Priority Data
May 4, 2015 (KR) .................. 10-2015-0062654

(51) Int. Cl.
*B32B 41/00* (2006.01)
*H01M 8/0286* (2016.01)
*H01M 8/04298* (2016.01)
*H01M 8/1018* (2016.01)

(52) U.S. Cl.
CPC ..... *H01M 8/0286* (2013.01); *H01M 8/04298* (2013.01); *H01M 2008/1095* (2013.01)

(58) Field of Classification Search
CPC ........... H01M 8/0286; H01M 8/04298; H01M 2008/1095

USPC .................. 156/64, 350, 351, 378, 379
See application file for complete search history.

(56) References Cited

U.S. PATENT DOCUMENTS

2010/0112403 A1* 5/2010 Berggren ............. H01M 8/00
429/452

FOREIGN PATENT DOCUMENTS

| JP | 2011-053190 A | 3/2011 |
| KR | 10-2012-0022145 A | 3/2012 |
| KR | 10-1251229 B1 | 4/2013 |

* cited by examiner

*Primary Examiner* — Michael N Orlando
*Assistant Examiner* — Joshel Rivera
(74) *Attorney, Agent, or Firm* — McDermott Will & Emery LLP

(57) ABSTRACT

A system for inspecting quality of a membrane-electrode assembly (MEA) of a fuel cell includes a bonding device configured to bond the MEA and a gas diffusion layer (GDL) to manufacture a bonded unit thereof. A transfer device adsorbs one surface of the bonded unit to transfer the bonded unit. An inspection device is disposed on one side of the bonded unit transferred by the transfer device and inspects an outer appearance of the bonded unit. A reversing device places the bonded unit thereon by the transfer device and reverses the bonded unit vertically. A loading and lifting device loads the bonded unit thereon after being transferred by the transfer device and adjusts a loading height.

16 Claims, 5 Drawing Sheets

SYSTEM FOR INSPECTING QUALITY OF MEMBRANE-ELECTRODE ASSEMBLY OF FUEL CELL AND QUALITY INSPECTION METHOD THEREOF

CROSS-REFERENCE TO RELATED APPLICATION

This application claims the benefit of priority to Korean Patent Application No. 10-2015-0062654 filed in the Korean Intellectual Property Office on May 4, 2015, the entire content of which is incorporated herein by reference.

TECHNICAL FIELD

The present disclosure relates to a system for inspecting quality of a membrane-electrode assembly (MEA) of a fuel cell, which bonds the MEA and a gas diffusion layer of the fuel cell and inspects the bonded unit, and a quality inspection method thereof.

BACKGROUND

As known, a fuel cell produces electricity through an electrochemical reaction between hydrogen and oxygen. The fuel cell may continuously produce electrical energy upon receiving a chemical reactant from outside without having a separate charging process.

A fuel cell may include separators (or bipolar plates) which are disposed on both sides of a membrane-electrode assembly (MEA) therebetween. A plurality of fuel cells may be arranged to form a fuel cell stack.

In the MEA, a core part of the fuel cell and an anode and a cathode as electrode catalyst layers are formed on both sides of an electrolytic membrane to transfer hydrogen ions. The MEA further includes a sub-gasket to protect the electrode catalyst layers and the electrolytic membrane and to secure assembly characteristics of the fuel cell.

When manufacturing the foregoing MEA, an electrode membrane sheet unwinds the electrolytic membrane which is wound in the form of a roll and continuously transfers electrode catalyst layers to be spaced apart by approximately, 150 mm pitch on both surfaces of the electrolytic membrane.

In a post-process, the electrode membrane sheet wound in the form of a roll is unwound and transferred, sub-gaskets in the form of a roll are unwound to be positioned on both surfaces of the electrode membrane sheet. The sub-gaskets and the electrode membrane sheet pass through between hot rollers such that the sub-gaskets are bonded to both surfaces of the electrode membrane sheet, thus manufacturing an MEA sheet in a roll-to-roll manner.

In addition, the MEA and a gas diffusion layer (GDL) are bonded at a high temperature, in which bonded assemblies and separators are alternately stacked to manufacture a fuel cell.

Research into a quality inspection system for inspecting quality of the assemblies and preventing a defective product from being applied to a fuel cell has been conducted.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system for inspecting quality of a membrane-electrode assembly (MEA) of a fuel cell having advantages of enhancing quality of a fuel cell by easily checking quality of a bonded unit obtained by bonding the MEA and a gas diffusion layer (GDL), and using only the bonded unit.

According to an exemplary embodiment of the present inventive concept, a system for inspecting quality of a membrane-electrode assembly (MEA) of a fuel cell, including: a bonding device configured to bond the MEA and a gas diffusion layer (GDL) to manufacture a bonded unit thereof. A transfer device adsorbs one surface of the bonded unit to transfer the bonded unit. An inspection device is disposed on one side of the bonded unit transferred by the transfer device and inspects an outer appearance of the bonded unit. A reversing device places the bonded unit thereon by the transfer device and reverses the bonded unit vertically. A loading and lifting device loads the bonded unit to thereon after being transferred by the transfer device and adjusts a loading height.

The bonding device may bond the MEA and the GDL with a preset pressure and at a preset temperature and transfer the bonded MEA and GDL through a conveyer.

The system may further include an aligning device correcting a position of the bonded unit on the conveyer.

The transfer device may vacuum-adsorb an upper surface of the bonded unit and transfer the bonded unit through a three-dimensional route.

The inspection device may inspect a displacement of the outer appearance of the bonded unit by using a laser and determine a bonding state of the bonded unit according to a displacement value.

The reversing device may include clampers disposed on both sides thereof to clamp both end portions of the bonded unit and may vertically reverse the bonded unit in a state in which the clampers clamp both end portions of the bonded unit.

The loading and lifting device may vary the loading height of the loaded bonded unit by rotating a screw.

The transfer device may vacuum-adsorb an upper surface of the bonded unit, and the inspection device may be disposed below the bonded unit.

When the bonded unit inspected by the inspection device meets conditions for the outer appearance, the bonded unit may be loaded in the loading and lifting device. When the bonded unit does not meet the conditions, the bonded unit may be taken out to the outside.

The inspection device may include an inspection vision sensing or displaying the outer appearance of the bonded unit on a screen.

According to another exemplary embodiment of the present inventive concept, a method for inspecting quality of a membrane-electrode assembly (MEA) of a fuel cell includes bonding the MEA and a gas diffusion layer (GDL) to each other. One surface of the bonded unit is vacuum adsorbed and the bonded unit is transferred. An outer appearance of another surface of the bonded unit is sensed while transferring the one vacuum-adsorbed surface of the bonded unit. The bonded unit is vertically reversed. The other surface of the vertically reversed bonded unit is vacuum-adsorbed and the bonded unit is transferred. An outer appearance of the one surface of the bonded unit is sensed while transferring the other vacuum-adsorbed surface of the bonded unit. When the bonded unit having one surface and the other surface thereof inspected meets conditions for the outer appearance, the bonded unit is loaded.

The method may further include taking out the bonded unit when the bonded unit having the outer appearance of one surface or the other surface is inspected does not meet the conditions for the outer appearance.

The method may further include correcting a position of the bonded unit in a width direction of a conveyer when the bonded unit is manufactured and transferred on the conveyer.

The step of reversing the bonded unit may include clamping both end portions of the bonded unit by using clamps, and reversing upper and lower surfaces of the bonded unit by rotating the clamps.

The step of sensing the outer appearance may include sensing a displacement of the outer appearance of the bonded unit by irradiating a laser, and determining a bonding state of the bonded unit according to a magnitude of the displacement.

When the magnitude of the displacement is within a preset range, the bonded unit may be loaded in a loading and lifting device. When the magnitude of the displacement is not within the preset range, the bonded unit may be taken out.

BRIEF DESCRIPTION OF THE DRAWINGS

The drawings are used to be referred to in describing exemplary embodiments of the present inventive concept, so a technical concept of the present disclosure should not be meant to restrict the invention to the accompanying drawings.

DETAILED DESCRIPTION OF THE EMBODIMENTS

Figure 1:
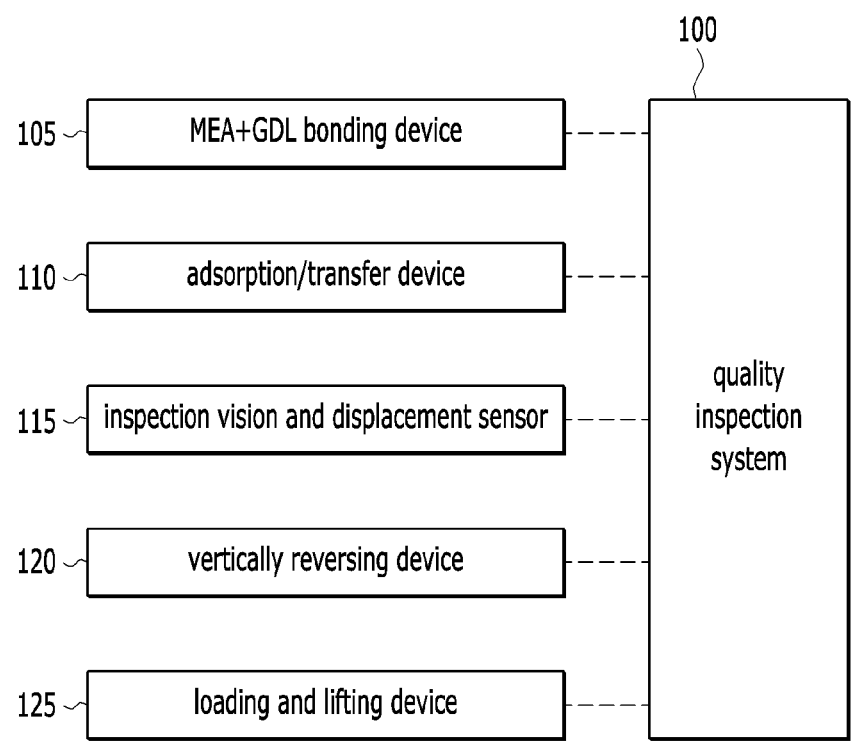
FIG. 1 is a schematic view illustrating a configuration of a system for inspecting quality of a membrane-electrode assembly (MEA) of a fuel cell according to an exemplary embodiment of the present inventive concept.

Hereinafter, the present disclosure will be described more fully with reference to the accompanying drawings, in which exemplary embodiments of the invention are shown. As those skilled in the art would realize, the described embodiments may be modified in various different ways, all without departing from the spirit or scope of the present disclosure.

In order to clearly describe the present disclosure, a portion irrelevant to a description of the present disclosure will be omitted, and like reference numerals refer to like elements throughout.

In the drawings, sizes and thickness of components are arbitrarily shown for the description purposes, so the present disclosure is not limited to the illustrations of the drawings and thicknesses are exaggerated to clearly express various parts and regions.

In the following descriptions, terms such as "first" and "second," etc., may be used only to distinguish one component from another as pertinent components are named the same, and order thereof is not limited.

Throughout the specification, unless explicitly described to the contrary, the word "comprise" and variations such as "comprises" or "comprising" will be understood to imply the inclusion of stated elements but not the exclusion of any other elements.

FIG. 1 is a schematic view illustrating a configuration of a system for inspecting quality of a membrane-electrode assembly (MEA) of a fuel cell according to an exemplary embodiment of the present inventive concept.

Referring to FIG. 1, a quality inspection system 100 includes a bonding device 105, a transfer device 110, an inspection device 115, a reversing device 120, and a loading and lifting device 125.

Figure 3A:
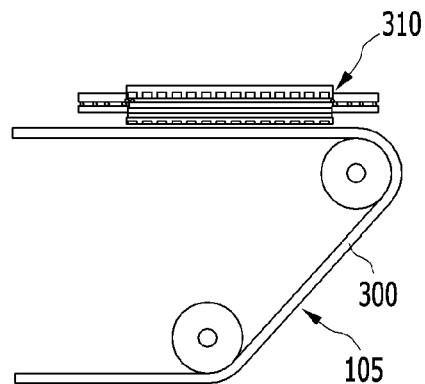
FIGS. 3A-3C are schematic views illustrating a configuration of portions of a bonding device, a transfer device, and an inspection device of the system for inspecting quality of an MEA of a fuel cell according to an exemplary embodiment of the present inventive concept.
Figure 3B:
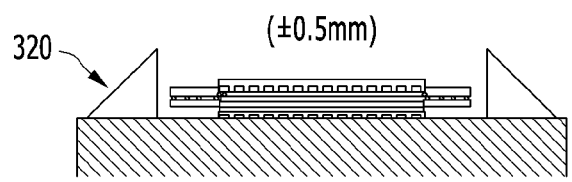
Figure 3C:
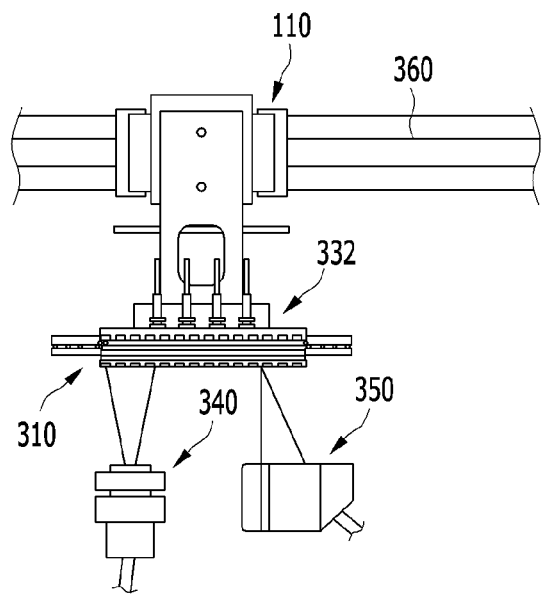

The bonding device 105 compresses a membrane-electrode assembly (MEA) and a gas diffusion layer (GDL) at a preset temperature and a preset pressure using two hot rollers, and here, the MEA and the GDL are stacked on a conveyer 300 and the stacked unit is compressed by the hot rollers to manufacture a bonded unit 310 (see FIGS. 3A-3C). A detailed structure of the bonding device 105 may be referred to a known art.

The transfer device 110 vacuum-adsorbs an upper surface of the bonded unit 310 and unloads the bonded unit 310 from the bonding device 105 along a preset route in a three-dimensional space, and transfers the bonded unit 310 to the inspection device 115, the vertically reversing device 120, and the loading and lifting device 125.

The inspection device 115 may inspect an outer appearance of a lower surface of the bonded unit 310 and display a corresponding result or transmit the result to a controller (not shown) having a separate calculation unit.

The inspection device 115 may include an inspection vision 340 or a laser displacement sensor 350. The inspection vision 340 may store the outer appearance of the bonded unit 310 on a screen or display the same, and the laser displacement sensor 350 irradiates a laser to the bonded unit 310 to sense a displacement of an outer appearance of the bonded unit 310.

The vertically reversing device 120 reverses an upper surface and a lower surface of the bonded unit 310. That is, the vertically reversing device 120 clamps both end portions of the bonded unit 310 and rotates the bonded unit 310 by 180 degrees with respect to a central axis in a length direction.

The bonded unit 310 reversed by the vertically reversing device 120 is vacuum-adsorbed again by the transfer device 110 and inspected by the inspection device 115, and the inspected bonded unit 310 is loaded on the loading and lifting device 125 or taken out.

FIGS. 3A-3C are schematic views illustrating a configuration of portions of a bonding device, a transfer device, and an inspection device of the system for inspecting quality of an MEA of a fuel cell according to an exemplary embodiment of the present inventive concept.

Referring to FIGS. 3A-3C, the bonding device 105 includes a conveyer 300 moving by a driving roller, and the bonded unit 310 is transferred on the conveyer 300 by a hot roller. An aligning device 320 adjusting a position of the bonded unit 310 is provided on both sides of the conveyer 300, and an alignment error may be within 0.5 mm.

The transfer device 110 may include a linear guide 360 and a vacuum adsorbing unit 332 disposed in a horizontal direction. The vacuum adsorbing unit 332 may move in a horizontal direction along the linear guide 360 or move up and down simultaneously. Further, the vacuum adsorbing unit 332 may vacuum-adsorb an upper surface of the bonded unit 310 by using vacuum pressure and transfers the bonded unit 310.

When the bonded unit 310 is transferred by the vacuum adsorbing unit 332 and the linear guide 360, the inspection vision 340 and the laser displacement sensor 350 disposed below the vacuum adsorbing unit 332 sequentially sense an outer appearance of the lower surface of the bonded unit 310.

Figure 4A:
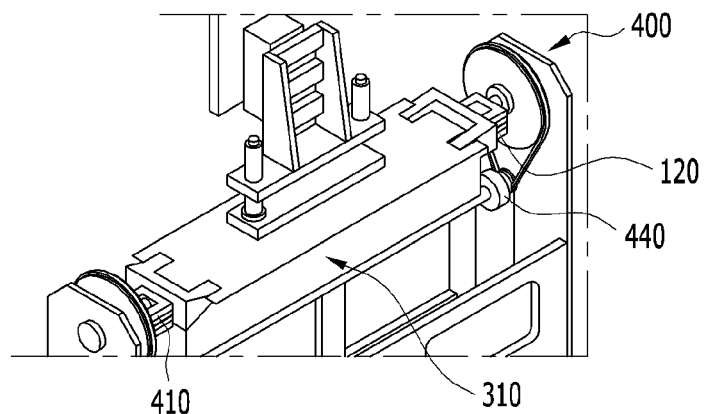
FIGS. 4A-4C are perspective views illustrating portions of a reversing device, the transfer device, and a loading and lifting device of the system for inspecting quality of an MEA of a fuel cell according to an exemplary embodiment of the present inventive concept.
Figure 4B:
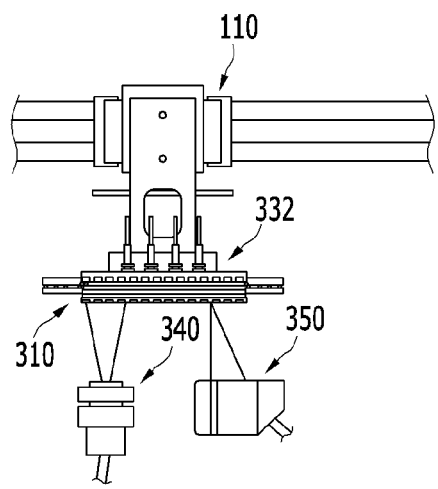
Figure 4C:
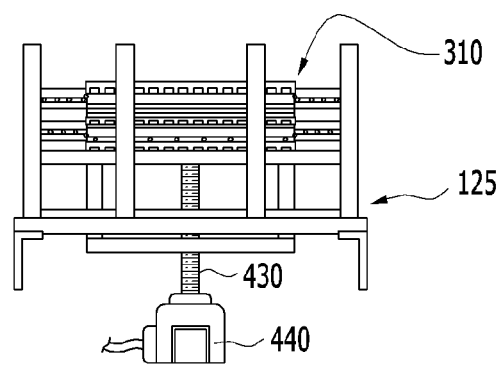

FIGS. 4A-4C are perspective views illustrating portions of a reversing device, the transfer device, and a loading and lifting device of the system for inspecting quality of an MEA of a fuel cell according to an exemplary embodiment of the present inventive concept.

Referring to FIGS. 4A-4C, the reversing device 120 includes clampers 410 clamping both end portions of the bonded unit 310 and a rotating unit 440 rotating the clampers 410.

The transfer device 110 transfers the bonded unit 310 to the reversing device 120, the clampers 410 clamp both end portions of the bonded unit 310, and rotate the bonded unit 310 by 180 degrees by means of the rotating unit 440.

Thereafter, while the transfer device 110 transfers the bonded unit 310 which is 180 degree rotated again, the inspection vision 340 and the laser displacement sensor 350 inspect a lower surface of the bonded unit 310.

Finally, when the bonded unit 310, which has been inspected by the inspection vision 340 and the laser displacement sensor 350, is passed, the bonded unit 310 is loaded in the loading and lifting device 125. When the bonded unit 310 fails to pass the inspection, the bonded unit 310 is taken out. Here, the loading and lifting device 125 may be lifted or lowered the loaded bonded units 310 through the screw 430 and the rotating unit 440.

Figure 5A:
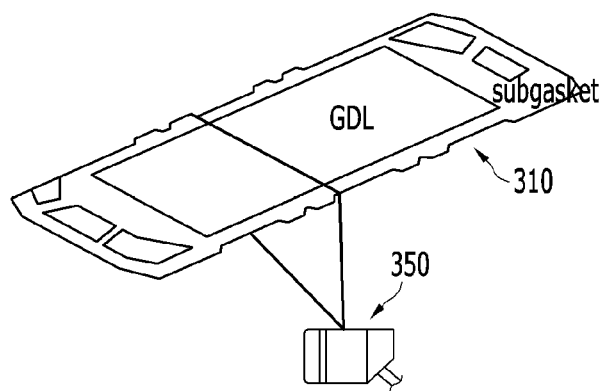
FIGS. 5A and 5B are a perspective view and a graph illustrating an inspection method using a laser displacement sensor of the system inspecting quality of an MEA of a fuel cell according to an exemplary embodiment of the present inventive concept and a result thereof.
Figure 5B:
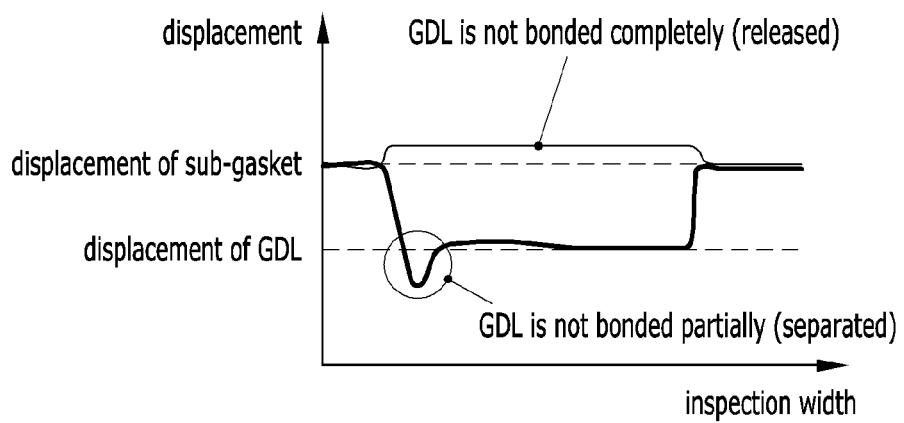

FIGS. 5A and 5B are a perspective view and a graph illustrating an inspection method using a laser displacement sensor of the system inspecting quality of an MEA of a fuel cell according to an exemplary embodiment of the present inventive concept and a result thereof.

Referring to FIG. 5A, the laser displacement sensor 350 irradiates a laser to a lower surface of the bonded unit 310 and senses a reflected laser, thereby sensing a displacement of an outer appearance of a sub-gasket and a displacement of an outer appearance of the GDL in the bonded unit 310.

Referring to FIG. 5B, the horizontal axis represents an inspection width and the vertical axis represents a displacement of an outer appearance.

The displacements include a displacement of the GDL and a displacement of the sub-gasket, and when the displacement of the GDL is outside of a preset range, the GDL may be determined to be in a non-bonded (separated) state.

When the displacement of the sub-gasket is outside of a preset range, the sub-gasket may be determined to be in a non-bonded (separated) state, and a partially non-bonding state or a completely non-bonding state may be determined according to a size of a separated range.

In the present disclosure, the bonding device 105, the transfer device 110, the inspection device 115, the reversing device 120, and the loading and lifting device 125 may be controlled by a control unit (not shown), and pass and failure of the bonding device 105 inspected by the inspection device 115 may also be determined by the controller.

The controller may be implemented as one or more micro-processors operated according to a preset program, and the preset program may include a series of commands for performing the method according to an exemplary embodiment of the present inventive concept to be described below.

Figure 2:
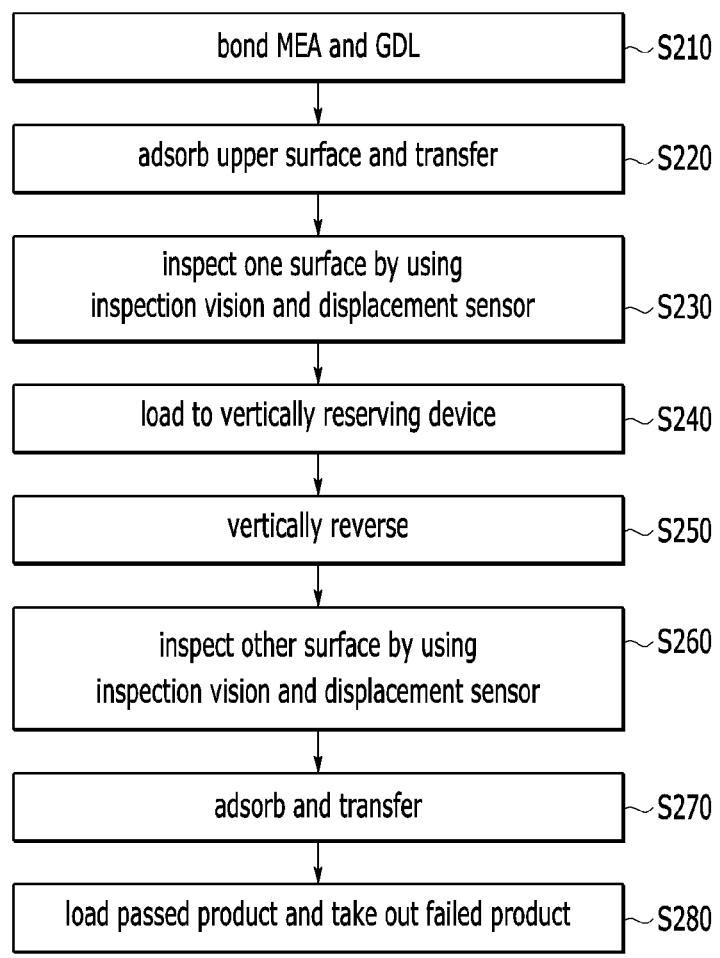
FIG. 2 is a flow chart illustrating a method for inspecting quality of an MEA of a fuel according to an exemplary embodiment of the present inventive concept.

FIG. 2 is a flow chart illustrating a method for inspecting quality of an MEA of a fuel cell according to an exemplary embodiment of the present inventive concept.

Referring to FIG. 2, the MEA and the GDL are bonded in step S210. The transfer device 110 vacuum-adsorbs an upper surface of the bonded unit 310 to lift the bonded unit 310 and transfers the lifted bonded unit 310 along a preset route in step S220.

The inspection device 115 inspects an outer appearance of one surface of the bonded unit 310 by using the inspection vision 340 and the laser displacement sensor 350 in step S230.

The bonded unit 310 is loaded to the reversing device 120 and fixed by the clampers 410 in step S240. The bonded unit 310 rotates by 180 degrees in step S250.

An outer appearance of the other surface of the bonded unit 310 is inspected by using the inspection device 115 in step S260. The inspected bonded unit 310 is transferred by the transfer device 110 in step S270, and when passed, the bonded unit 310 is loaded in the loading and lifting device 125 and when failed, the bonded unit 310 is taken out to the outside in step S280.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for inspecting quality of a membrane-electrode assembly (MEA) of a fuel cell, the system comprising:
   a bonding device bonding the MEA and a gas diffusion layer (GDL) to manufacture a bonded unit of the MEA and the GDL;
   a transfer device adsorbing one surface of the bonded unit to transfer the bonded unit;
   an inspection device disposed on one side of the bonded unit which is transferred by the transfer device, the inspection device inspecting an outer appearance of the bonded unit;
   a reversing device placing the bonded unit on the reversing device by the transfer device and vertically reversing the bonded unit; and
   a loading and lifting device loading the bonded unit thereon after being transferred by the transfer device, and adjusting a loading height.

2. The system of claim 1, wherein:
   the bonding device bonds the MEA and the GDL with a preset pressure and at a preset temperature and transfers the bonded unit through a conveyer.

3. The system of claim 2, further comprising:
   an aligning device correcting a position of the bonded unit on the conveyer.

4. The system of claim 1, wherein:
   the transfer device vacuum-adsorbs an upper surface of the bonded unit and transfers the bonded unit through a three-dimensional route.

5. The system of claim 1, wherein:
   the inspection device inspects a displacement of the outer appearance of the bonded unit using a laser and determines a bonding state of the MEA and the GDL according to a displacement value.

6. The system of claim 1, wherein:
the reversing device includes clampers disposed on both sides thereof to clamp both end portions of the bonded unit and vertically reverses the bonded unit in a state in which the clampers clamp both end portions of the bonded unit.

7. The system of claim 1, wherein:
the loading and lifting device varies the loading height of the bonded unit by rotating a screw.

8. The system of claim 1, wherein:
the transfer device vacuum-adsorbs an upper surface of the bonded unit, and the inspection device is disposed below the bonded unit.

9. The system of claim 1, wherein:
when the bonded unit inspected by the inspection device meets conditions for the outer appearance, the bonded unit is loaded in the loading and lifting device, and
when the bonded unit does not meet the conditions for the outer appearance, the bonded unit is taken out to outside.

10. The system of claim 1, wherein:
the inspection device includes an inspection vision configured to sense or display the outer appearance of the bonded unit on a screen.

11. A method for inspecting quality of a membrane-electrode assembly (MEA) of a fuel cell, the method comprising:
bonding the MEA and a gas diffusion layer (GDL) to each other;
vacuum-adsorbing one surface of the bonded unit and transferring the bonded unit;
sensing an outer appearance of another surface of the bonded unit while transferring the one vacuum-adsorbed surface of the bonded unit;
reversing the bonded unit vertically;
vacuum-adsorbing the other surface of the vertically reversed bonded unit and transferring the bonded unit;
sensing an outer appearance of the one surface of the bonded unit while transferring the other vacuum-adsorbed surface of the bonded unit; and
loading the bonded unit when the bonded unit, of which the one surface and the other surface thereof are inspected, meets conditions for the outer appearance.

12. The method of claim 11, further comprising:
taking out the bonded unit when the bonded unit having the outer appearance of the one surface or the other surface thereof is inspected does not meet the conditions for the outer appearance.

13. The method of claim 11, further comprising:
correcting a position of the bonded unit in a width direction of a conveyer when the bonded unit is manufactured and transferred on the conveyer.

14. The method of claim 11, wherein the step of reversing the bonded unit comprises:
clamping both end portions of the bonded unit using clamps; and
reversing upper and lower surfaces of the bonded unit by rotating the clamps.

15. The method of claim 11, wherein the step of sensing the outer appearance comprises:
sensing a displacement of the outer appearance of the bonded unit by irradiating a laser; and
determining a bonding state of the bonded unit according to a magnitude of the displacement.

16. The method of claim 15, wherein:
when the magnitude of the displacement is within a preset range, the bonded unit is loaded in a loading and lifting device, and
when the magnitude of the displacement is not within the preset range, the bonded unit is taken out.

* * * * *